(12) United States Patent
Onodera et al.

(10) Patent No.: US 10,755,859 B2
(45) Date of Patent: Aug. 25, 2020

(54) ELECTRONIC COMPONENT

(71) Applicant: TDK CORPORATION, Tokyo (JP)

(72) Inventors: Shinya Onodera, Tokyo (JP); Takehisa Tamura, Tokyo (JP); Ken Morita, Tokyo (JP); Atsushi Takeda, Tokyo (JP)

(73) Assignee: TDK CORPORATION, Tokyo (JP)

( * ) Notice: Subject to any disclaimer, the term of this patent is extended or adjusted under 35 U.S.C. 154(b) by 9 days.

(21) Appl. No.: 16/189,618

(22) Filed: Nov. 13, 2018

(65) Prior Publication Data

US 2019/0164696 A1 May 30, 2019

(30) Foreign Application Priority Data

Nov. 29, 2017 (JP) ................ 2017-228901

(51) Int. Cl.
| | |
|---|---|
| *H01G 4/30* | (2006.01) |
| *H01G 4/232* | (2006.01) |
| *H01G 4/12* | (2006.01) |
| *H01G 4/008* | (2006.01) |
| *H01G 4/005* | (2006.01) |

(52) U.S. Cl.
CPC ............ *H01G 4/30* (2013.01); *H01G 4/005* (2013.01); *H01G 4/008* (2013.01); *H01G 4/1227* (2013.01); *H01G 4/232* (2013.01)

(58) Field of Classification Search
None
See application file for complete search history.

(56) References Cited

U.S. PATENT DOCUMENTS

| | | | | | |
|---|---|---|---|---|---|
| 4,750,084 | A | * | 6/1988 | Nikaidoh | ............... H01G 4/30 29/25.42 |
| 5,277,723 | A | * | 1/1994 | Kodama | ............... B32B 18/00 156/288 |
| 6,493,207 | B2 | * | 12/2002 | Nakano | ............... H01G 4/0085 361/306.3 |
| 10,347,421 | B2 | * | 7/2019 | Chung | ............... H01G 4/005 |
| 2005/0264975 | A1 | * | 12/2005 | Yamazaki | ............... H01C 1/02 361/301.1 |
| 2012/0307417 | A1 | * | 12/2012 | Kim | ............... H01G 4/30 361/321.2 |
| 2014/0182907 | A1 | * | 7/2014 | Lee | ............... H05K 1/162 174/258 |

(Continued)

FOREIGN PATENT DOCUMENTS

JP  H08-107038 A  4/1996

*Primary Examiner* — Dion Ferguson
(74) *Attorney, Agent, or Firm* — Oliff PLC

(57) ABSTRACT

An element body of a rectangular parallelepiped shape includes a pair of principal surfaces opposing each other in a first direction, a pair of side surfaces opposing each other in a second direction, and a pair of end surfaces opposing each other in a third direction. An external electrode disposed on an end portion of the element body in the third direction. When viewed from the third direction, a width of the element body in the second direction is the largest at a central position in the first direction, and gradually decreases from the central portion in the first direction. When viewed from the third direction, a position in which a length from one end to another end of the conductive resin layer in the second direction is the largest is located closer to the one principal surface than the central position.

7 Claims, 11 Drawing Sheets

(56) References Cited

U.S. PATENT DOCUMENTS

| | | | |
|---|---|---|---|
| 2015/0116896 A1* | 4/2015 | Inazuka | H01G 4/1227 |
| | | | 361/301.4 |
| 2016/0234979 A1* | 8/2016 | Lee | H01G 4/40 |
| 2016/0240314 A1* | 8/2016 | Fujii | H01G 4/30 |
| 2018/0068792 A1* | 3/2018 | Egashira | H01B 1/02 |

* cited by examiner

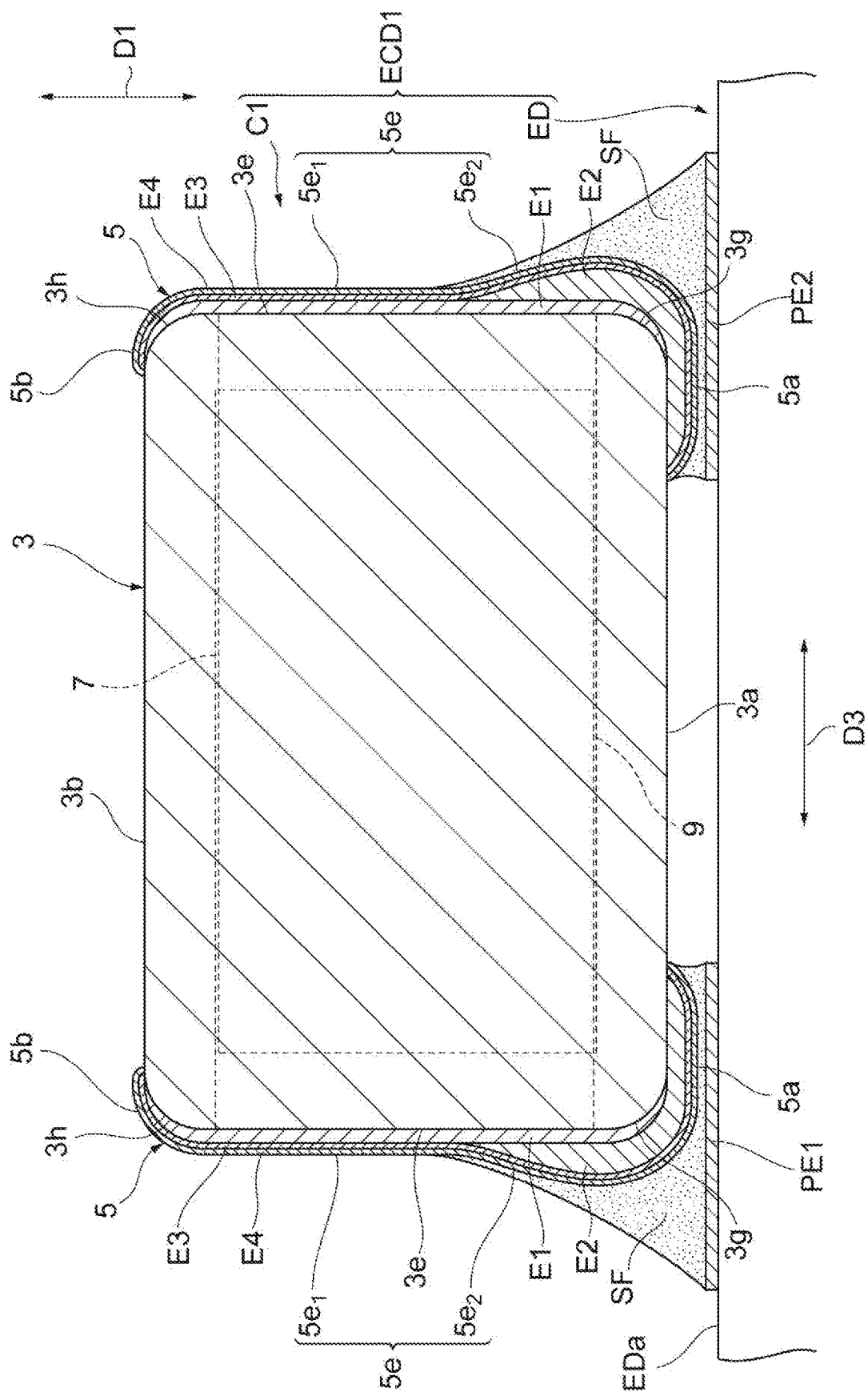

ELECTRONIC COMPONENT

BACKGROUND OF THE INVENTION

1. Field of the Invention

The present invention relates to an electronic component.

2. Description of Related Art

Known electronic components include an element body of a rectangular parallelepiped shape and a plurality of external electrodes (see, for example, Japanese Unexamined Patent Publication No. H8-107038). The element body includes a pair of principal surfaces opposing each other, a pair of end surfaces opposing each other, and a pair of side surfaces opposing each other. The plurality of external electrodes is disposed at each end portion of the element body in a direction in which the pair of end surfaces opposes each other. The external electrode includes a conductive resin layer.

SUMMARY OF THE INVENTION

In a case in which the electronic component is solder-mounted on an electronic device, external force applied onto the electronic component from the electronic device may act as stress on the element body. The electronic device includes, for example, a circuit board or an electronic component. The external force acts on the element body from a solder fillet formed at the solder-mounting, through the external electrode. In this case, a crack may occur in the element body. The electronic component in which the external electrode includes the conductive resin layer suppresses occurrence of a crack due to the external force in the element body.

In a case in which a thickness of the conductive resin layer is increased to sufficiently obtain the effect of suppressing a crack in the element body, a size of the electronic component increases as the thickness increases. Therefore, it may be difficult to sufficiently obtain the effect of suppressing a crack in the element body without increasing the size of the electronic component.

An object of one aspect of the present invention is to provide an electronic component that suppresses an increase in size and sufficiently suppresses occurrence of a crack in an element body.

An electronic component according to one aspect includes an element body of a rectangular parallelepiped shape and a plurality of external electrodes. The element body includes a pair of principal surfaces opposing each other in a first direction, a pair of side surfaces opposing each other in a second direction, and a pair of end surfaces opposing each other in a third direction. The plurality of external electrodes is disposed at both end portions of the element body in the third direction. The plurality of external electrodes includes a conductive resin layer. The conductive resin layer covers one principal surface of the pair of principal surfaces and the pair of side surfaces. When viewed from the third direction, the element body includes a maximum width portion in which a width in the second direction is the largest at a central position in the first direction. The width of the element body gradually decreases from the maximum width portion in the first direction. When viewed from the third direction, a maximum position in which a length from one end to another end of the conductive resin layer in the second direction is the largest is located closer to the one principal surface than the maximum width portion in the first direction.

In the one aspect, the external electrode includes the conductive resin layer covering the one principal surface and the pair of side surfaces of the element body. Even in a case in which external force is applied onto the electronic component from the electronic device, the conductive resin layer absorbs stress acting on the element body. Therefore, the one aspect suppresses occurrence of a crack due to the external force in the element body.

When viewed from the third direction, the maximum position of the conductive resin layer is located closer to one principal surface than the maximum width portion of the element body in the first direction. When viewed from the third direction, the conductive resin layer is provided in such a manner that the maximum position is located in a region of the element body in which the width in the second direction is smaller than the maximum width. Therefore, even in a case in which the thickness of the conductive resin layer is made large to sufficiently suppress the occurrence of a crack in the element body, the conductive resin layer tends not to protrude outward from the element body in the second direction when viewed from the third direction.

Consequently, in the one aspect, an increase in size is suppressed and the occurrence of a crack in the element body is sufficiently suppressed.

In a case in which an element is described as covering another element, the element may directly cover the other element or indirectly cover the other element.

In the one aspect, when viewed from the third direction, the width of the maximum width portion in the second direction may be larger than the length at the maximum position of the conductive resin layer. In this configuration, when viewed from the third direction, the element body protrudes outward from the conductive resin layer in the second direction. Even in a case in which a plurality of electronic components is mounted narrowly adjacent to each other, a distance between the external electrodes is larger than a distance between the element bodies between the adjacent electronic components. Therefore, a short circuit due to a solder bridge tends not to occur between the adjacent electronic components. The conductive resin layer does not protrude outward from the element body in the second direction when viewed from the third direction, and thus the conductive resin layer tends not to receive impact from the outside and tends not to be peeled off.

The one aspect may include a plurality of internal conductors that is disposed in the element body and is connected to the external electrode. The one principal surface may be arranged to constitute a mounting surface. The plurality of internal conductors may oppose each other in the second direction. In this configuration, a current path formed for each internal conductor is short. Therefore, this configuration has low equivalent series inductance (ESL).

In the one aspect, the conductive resin layer may not cover another principal surface of the pair of principal surfaces. In this configuration, the one principal surface covered with the conductive resin layer and the other principal surface not covered with the conductive resin layer are easily distinguished. Therefore, when the electronic component is mounted, the principal surface arranged to constitute the mounting surface is reliably identified, and the electronic component is appropriately picked up.

The present invention will become more fully understood from the detailed description given hereinafter and the accompanying drawings which are given by way of illustration only, and thus are not to be considered as limiting the present invention.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

FIG. 11 is a view illustrating a mounting structure of the multilayer capacitor according to the embodiment.

DETAILED DESCRIPTION OF EMBODIMENTS

Figure 1:
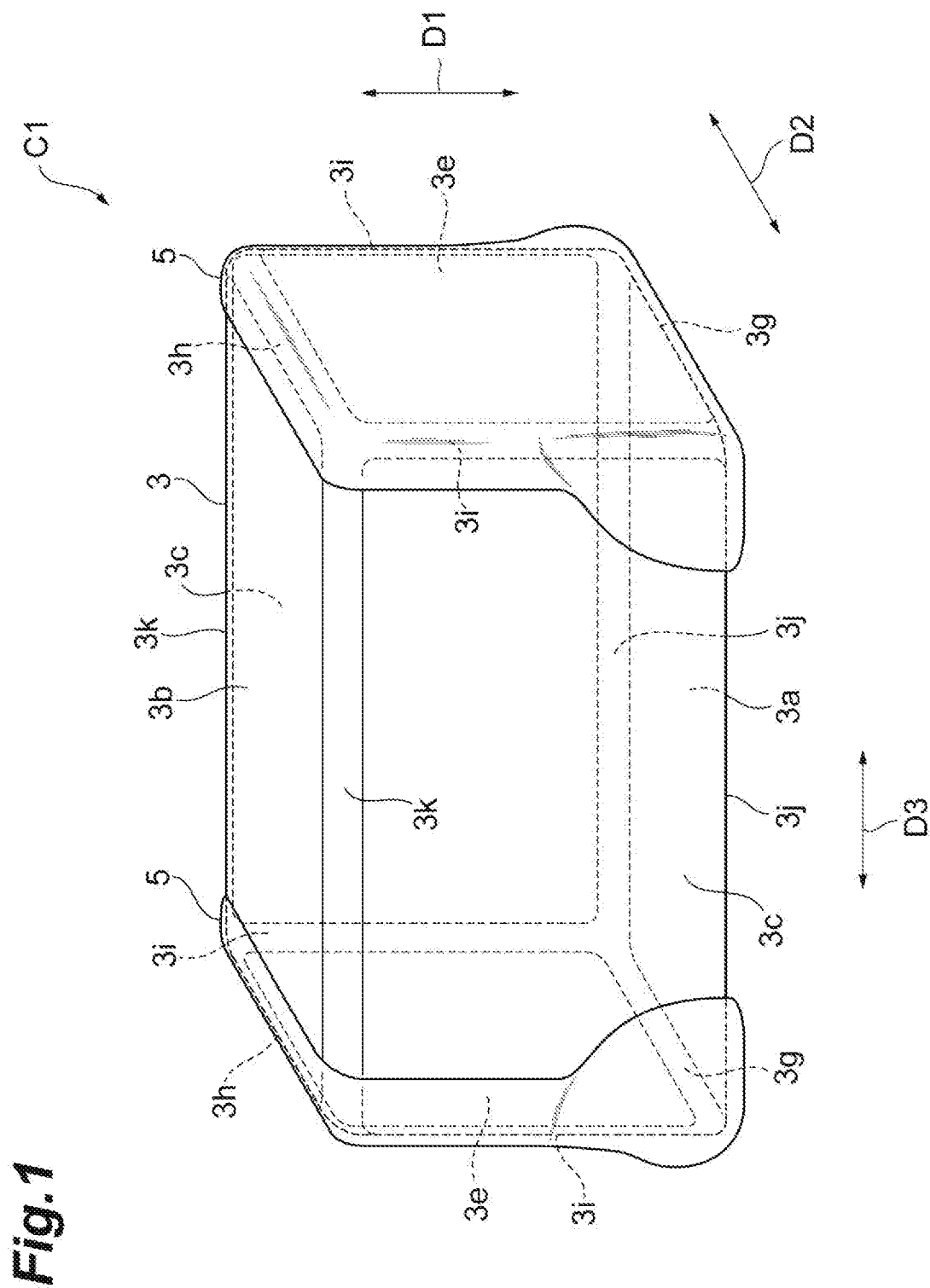
FIG. 1 is a perspective view of a multilayer capacitor according to an embodiment.

Hereinafter, embodiments of the present invention will be described in detail with reference to the accompanying drawings. In the following description, the same elements or elements having the same functions are denoted with the same reference numerals and overlapped explanation is omitted.

Figure 2:
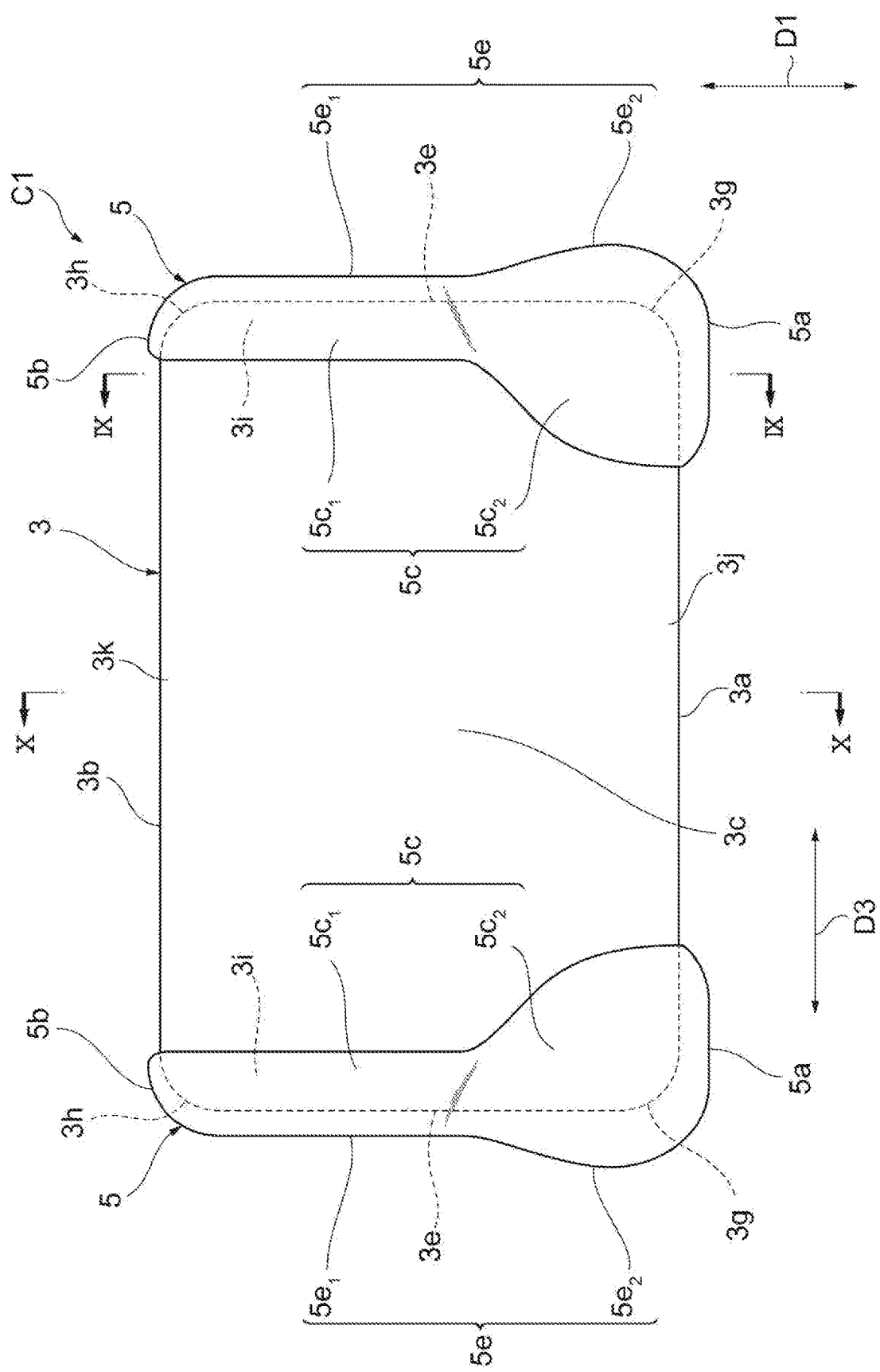
FIG. 2 is a side view of the multilayer capacitor according to the embodiment.
Figure 3:
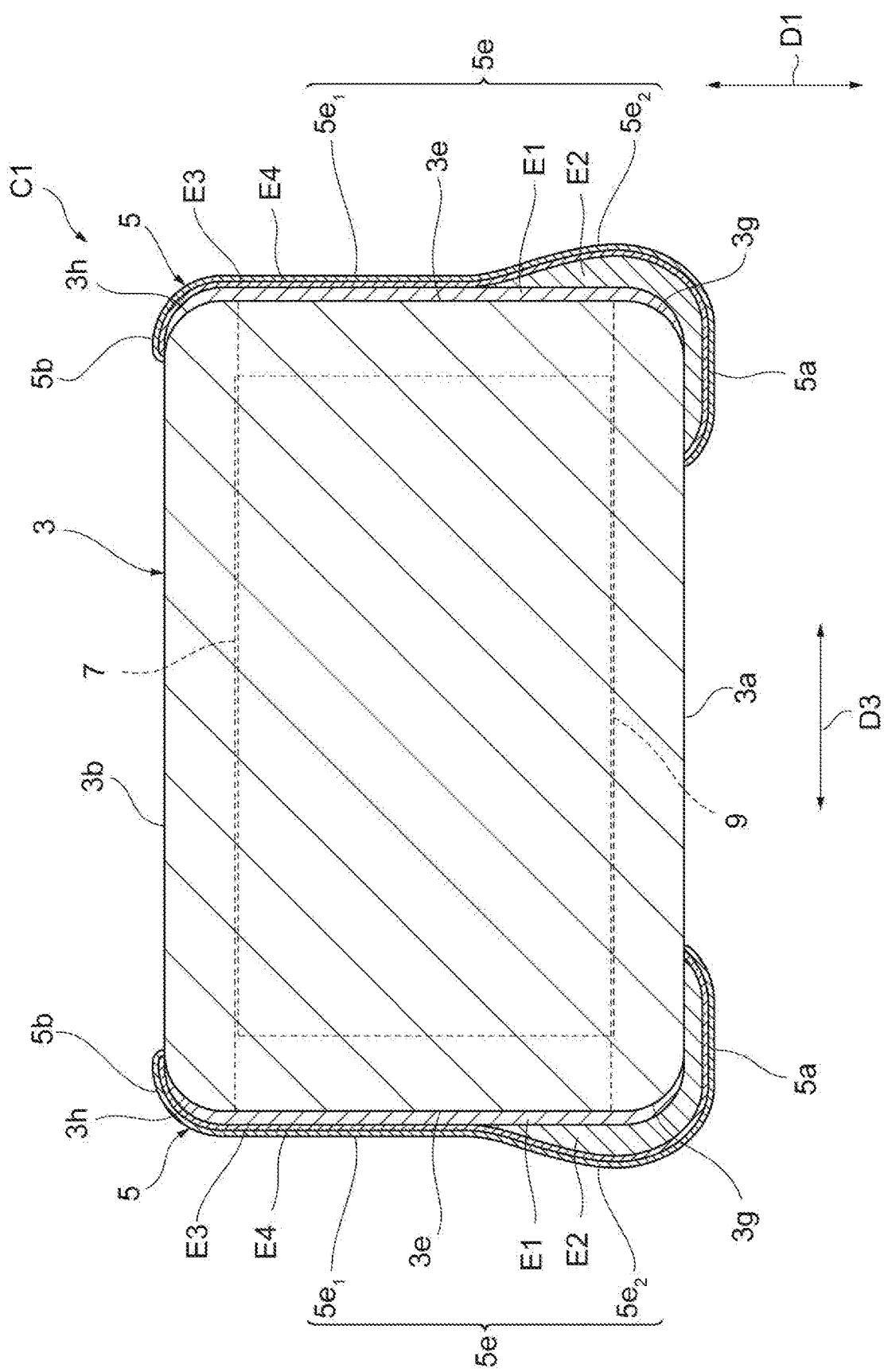
FIG. 3 is a view illustrating a cross-sectional configuration of the multilayer capacitor according to the embodiment.
Figure 4:
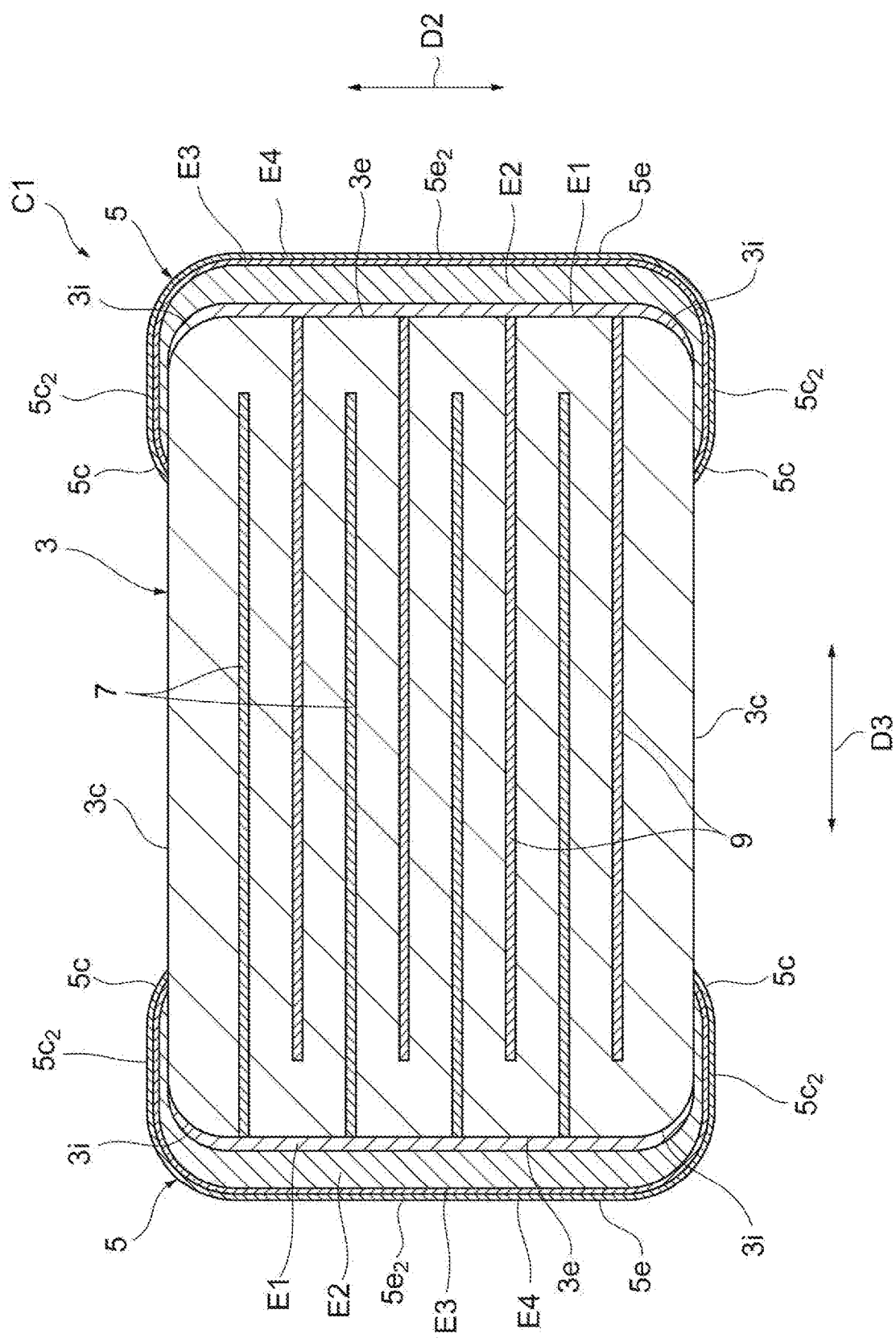
FIG. 4 is a view illustrating the cross-sectional configuration of the multilayer capacitor according to the embodiment.
Figure 5:
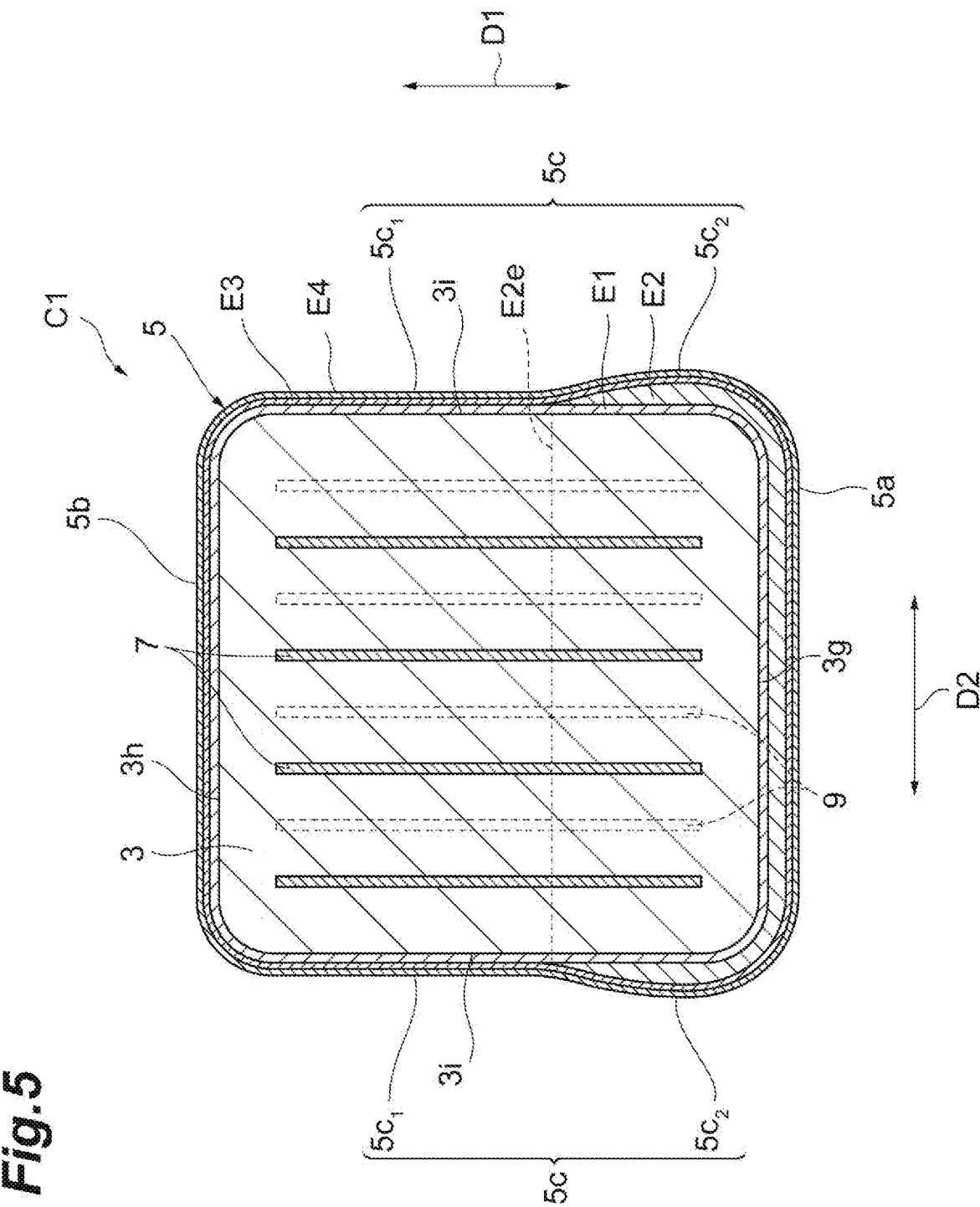
FIG. 5 is a view illustrating the cross-sectional configuration of the multilayer capacitor according to the embodiment.
Figure 6:
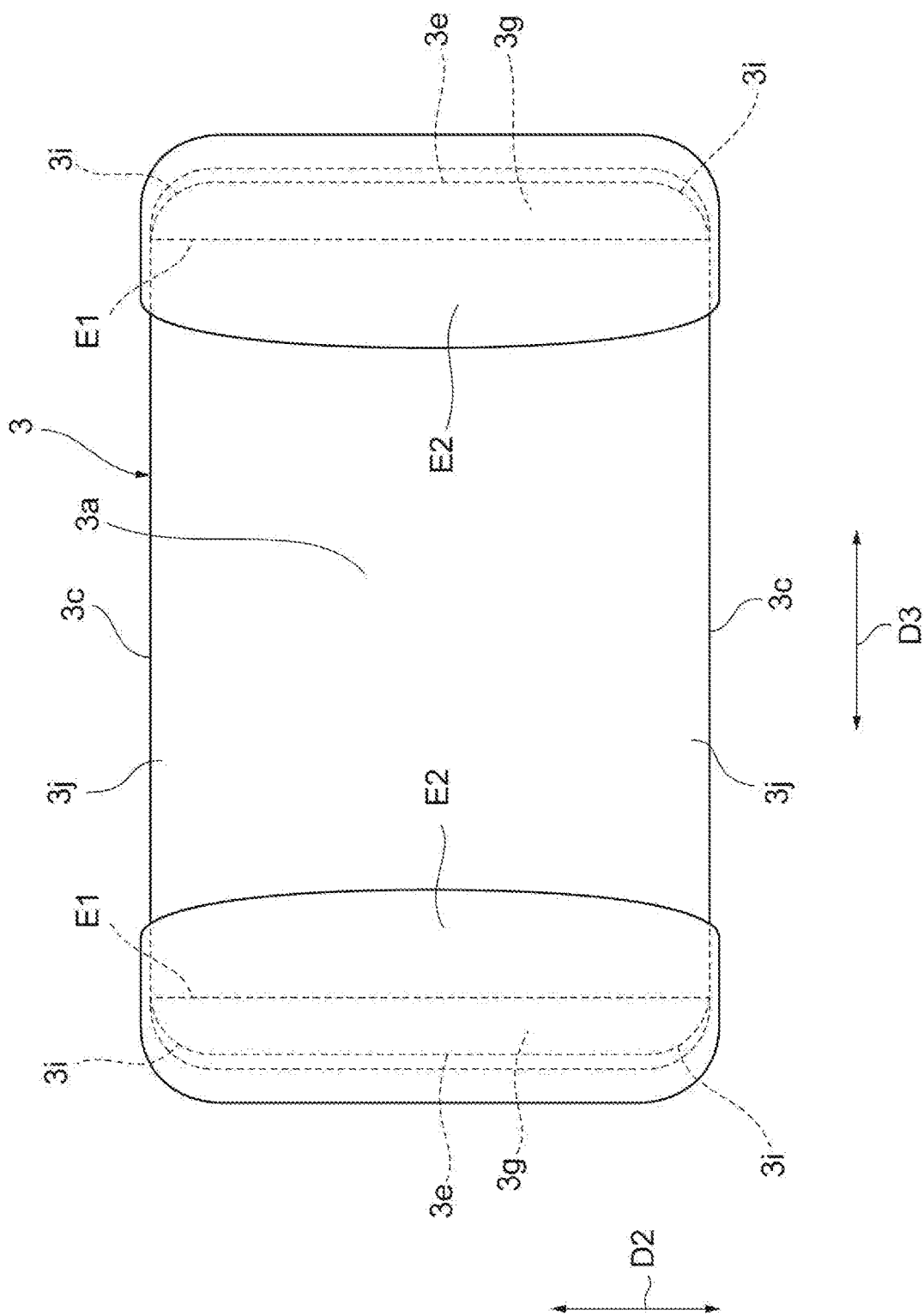
FIG. 6 is a plan view illustrating an element body, a first electrode layer, and a second electrode layer.
Figure 7:
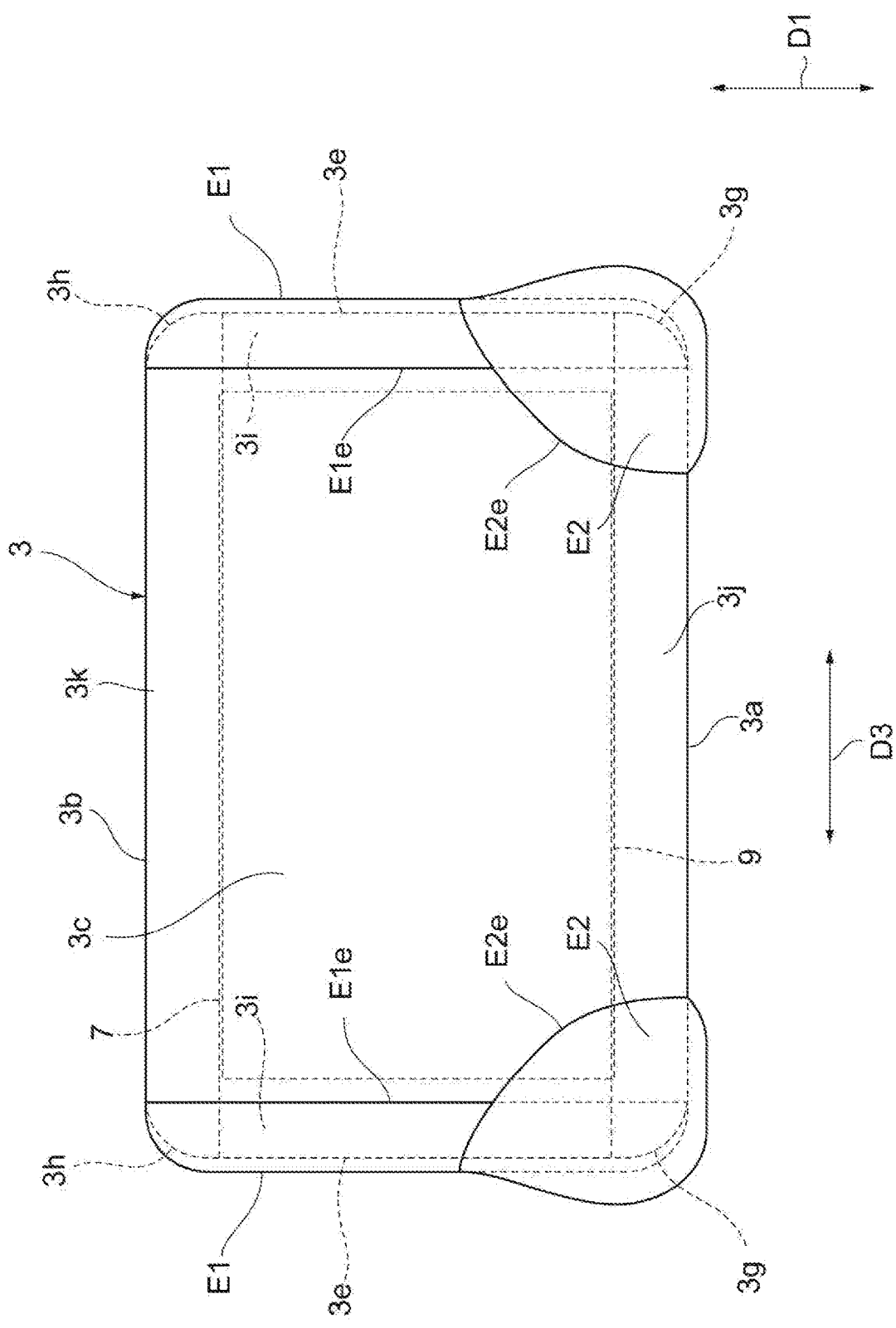
FIG. 7 is a side view illustrating the element body, the first electrode layer, and the second electrode layer.
Figure 8:
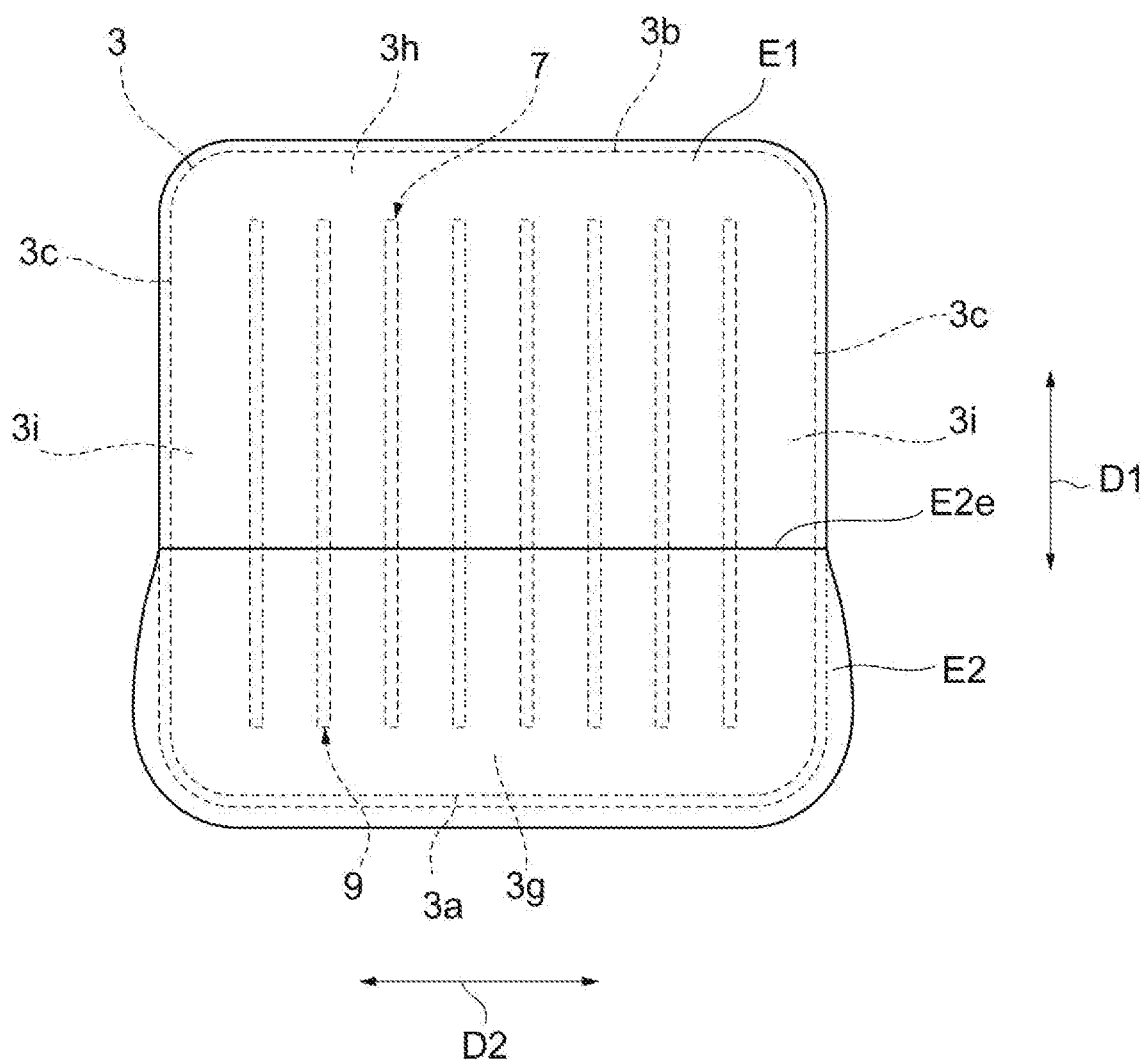
FIG. 8 is an end view illustrating the element body, the first electrode layer, and the second electrode layer.

A configuration of a multilayer capacitor C1 according to an embodiment will be described with reference to FIGS. 1 to 8. FIG. 1 is a perspective view of the multilayer capacitor according to the embodiment. FIG. 2 is a side view of the multilayer capacitor according to the embodiment. FIGS. 3 to 5 are views illustrating a cross-sectional configuration of the multilayer capacitor according to the embodiment. FIG. 6 is a plan view illustrating an element body, a first electrode layer, and a second electrode layer. FIG. 7 is a side view illustrating the element body, the first electrode layer, and the second electrode layer. FIG. 8 is an end view illustrating the element body, the first electrode layer, and the second electrode layer. In the present embodiment, an electronic component is, for example, the multilayer capacitor C1.

As illustrated in FIG. 1, the multilayer capacitor C1 includes an element body 3 of a rectangular parallelepiped shape and a plurality of external electrodes 5. In the present embodiment, the multilayer capacitor C1 includes a pair of external electrodes 5. The pair of external electrodes 5 is disposed on an outer surface of the element body 3. The pair of external electrodes 5 is separated from each other. The rectangular parallelepiped shape includes a rectangular parallelepiped shape in which corners and ridges are chamfered, and a rectangular parallelepiped shape in which the corners and ridges are rounded.

The element body 3 includes a pair of principal surfaces 3a and 3b opposing each other, a pair of side surfaces 3c opposing each other, and a pair of end surfaces 3e opposing each other. The pair of principal surfaces 3a and 3b and the pair of side surfaces 3c have a rectangular shape. The direction in which the pair of principal surfaces 3a and 3b opposes each other is a first direction D1. The direction in which the pair of side surfaces 3c opposes each other is a second direction D2. The direction in which the pair of end surfaces 3e opposes each other is a third direction D3. The multilayer capacitor C1 is solder-mounted on an electronic device. The electronic device includes, for example, a circuit board or an electronic component. The principal surface 3a of the multilayer capacitor C1 opposes the electronic device. The principal surface 3a is arranged to constitute a mounting surface. The principal surface 3a is the mounting surface. For example, in a case in which the principal surface 3a constitutes one principal surface, the principal surface 3b constitutes another principal surface.

The first direction D1 is a direction orthogonal to the respective principal surfaces 3a and 3b and is orthogonal to the second direction D2. The third direction D3 is a direction in parallel with the respective principal surfaces 3a and 3b and the respective side surfaces 3c, and is orthogonal to the first direction D1 and the second direction D2. The second direction D2 is a direction orthogonal to the respective side surfaces 3c. The third direction D3 is a direction orthogonal to the respective end surfaces 3e. In the present embodiment, a length of the element body 3 in the third direction D3 is larger than a length of the element body 3 in the first direction D1, and is also larger than a length of the element body 3 in the second direction D2. The third direction D3 is a longitudinal direction of the element body 3.

In FIGS. 1 to 8, for convenience of illustration of the multilayer capacitor C1, each side surface 3c is illustrated as an approximately flat surface. As will be described later with reference to FIGS. 9 and 10, each actual side surface 3c has a convex surface bulging outward.

The pair of side surfaces 3c extends in the first direction D1 to couple the pair of principal surfaces 3a and 3b. The pair of side surfaces 3c also extends in the third direction D3. The pair of end surfaces 3e extends in the first direction D1 to couple the pair of principal surfaces 3a and 3b. The pair of end surfaces 3e also extends in the second direction D2.

The element body 3 includes a pair of ridge portions 3g, a pair of ridge portions 3h, four ridge portions 3i, a pair of ridge portions 3j, and a pair of ridge portions 3k. The ridge portion 3g is located between the end surface 3e and the principal surface 3a. The ridge portion 3h is located between the end surface 3e and the principal surface 3b. The ridge portion 3i is located between the end surface 3e and the side surface 3c. The ridge portion 3j is located between the principal surface 3a and the side surface 3c. The ridge portion 3k is located between the principal surface 3b and the side surface 3c. In the present embodiment, each of the ridge portions 3g, 3h, 3i, 3j, and 3k is rounded to curve. The element body 3 is subject to what is called a round chamfering process.

The end surface 3e and the principal surface 3a are indirectly adjacent to each other with the ridge portion 3g between the end surface 3e and the principal surface 3a. The end surface 3e and the principal surface 3b are indirectly adjacent to each other with the ridge portion 3h between the end surface 3e and the principal surface 3b. The end surface 3e and the side surface 3c are indirectly adjacent to each other with the ridge portion 3i between the end surface 3e and the side surface 3c. The principal surface 3a and the side surface 3c are indirectly adjacent to each other with the ridge portion 3j between the principal surface 3a and the side surface 3c. The principal surface 3b and the side surface 3c are indirectly adjacent to each other with the ridge portion 3k between the principal surface 3b and the side surface 3c.

The element body 3 is configured by laminating a plurality of dielectric layers in the second direction D2. The element body 3 includes the plurality of laminated dielectric layers. In the element body 3, a lamination direction of the plurality of dielectric layers coincides with the second direction D2. Each dielectric layer includes, for example, a sintered body of a ceramic green sheet containing a dielectric material. The dielectric material includes, for example, a dielectric ceramic of $BaTiO_3$ base, $Ba(Ti,Zr)O_3$ base, or $(Ba,Ca)TiO_3$ base. In an actual element body 3, each of the dielectric layers is integrated to such an extent that a boundary between the dielectric layers cannot be visually recognized. In the element body 3, the lamination direction of the plurality of dielectric layers may coincide with the first direction D1.

As illustrated in FIGS. 3 to 5, the multilayer capacitor C1 includes a plurality of internal electrodes 7 and a plurality of internal electrodes 9. Each of the internal electrodes 7 and 9 is an internal conductor disposed in the element body 3. Each of the internal electrodes 7 and 9 is made of a conductive material that is commonly used as an internal conductor of a multilayer electronic component. The conductive material includes, for example, a base metal. The conductive material includes, for example, Ni or Cu. Each of the internal electrodes 7 and 9 is configured as a sintered body of conductive paste containing the conductive material described above. In the embodiment, the internal electrodes 7 and 9 are made of Ni.

The internal electrodes 7 and the internal electrodes 9 are disposed in different positions (layers) in the second direction D2. The internal electrodes 7 and the internal electrodes 9 are alternately disposed in the element body 3 to oppose each other in the second direction D2 with an interval therebetween. Polarities of the internal electrodes 7 and the internal electrodes 9 are different from each other. In a case in which the lamination direction of the plurality of dielectric layers is the first direction D1, the internal electrodes 7 and the internal electrodes 9 are disposed in different positions (layers) in the first direction D1. One end of each of the internal electrodes 7 and 9 is exposed to a corresponding end surface 3e of the pair of the end surfaces 3e. Each of the internal electrodes 7 and 9 includes the one end exposed to the corresponding end surface 3e.

The plurality of internal electrodes 7 and the plurality of internal electrodes 9 are alternately disposed in the second direction D2. The internal electrodes 7 and 9 are located in a plane approximately orthogonal to the principal surfaces 3a and 3b. The internal electrodes 7 and the internal electrodes 9 oppose each other in the second direction D2. The direction (second direction D2) in which the internal electrodes 7 and the internal electrodes 9 oppose each other is orthogonal to the direction (first direction D1) orthogonal to the principal surfaces 3a and 3b.

As illustrated in FIG. 2, the external electrodes 5 are disposed at both end portions of the element body 3 in the third direction D3. Each of the external electrodes 5 is disposed on the corresponding end surface 3e side of the element body 3. As illustrated in FIGS. 3 to 5, the external electrode 5 includes a plurality of electrode portions 5a, 5b, 5c, and 5e. The electrode portion 5a is disposed on the principal surface 3a and the ridge portion 3g. The electrode portion 5b is disposed on the ridge portion 3h. The electrode portion 5c is disposed on each side surface 3c and each ridge portion 3i. The electrode portion 5e is disposed on the corresponding end surface 3e. The external electrode 5 also includes electrode portions disposed on the ridge portion 3j.

The external electrode 5 is formed on the four surfaces, that is, the principal surface 3a, the end surface 3e, and the pair of side surfaces 3c, as well as on the ridge portions 3g, 3h, 3i, and 3j. The electrode portions 5a, 5b, 5c, and 5e adjacent each other are coupled and are electrically connected to each other. In the present embodiment, the external electrode 5 is not intentionally formed on the principal surface 3b. Each electrode portion 5e covers all one ends of the corresponding internal electrodes 7 or 9. The electrode portion 5e is directly connected to the corresponding internal electrodes 7 or 9. The external electrode 5 is electrically connected to the corresponding internal electrodes 7 or 9.

As illustrated in FIGS. 3 to 5, the external electrode 5 includes a first electrode layer E1, second electrode layers $E2_1$ and $E2_2$, a third electrode layer E3, and a fourth electrode layer E4. The fourth electrode layer E4 is arranged to constitute the outermost layer of the external electrode 5. Each of the electrode portions 5a, 5c, and 5e includes the first electrode layer E1, the second electrode layer E2, the third electrode layer E3, and the fourth electrode layer E4. The electrode portion 5b includes the first electrode layer E1, the third electrode layer E3, and the fourth electrode layer E4.

The electrode portion 5a is four-layered on the ridge portion 3g, and is three-layered on the principal surface 3a. The electrode portion 5a includes the first electrode layer E1, the second electrode layer E2, the third electrode layer E3, and the fourth electrode layer E4 on the ridge portion 3g. The electrode portion 5a includes the second electrode layer E2, the third electrode layer E3, and the fourth electrode layer E4 on the principal surface 3a. The first electrode layer E1 included in the electrode portion 5a is disposed on the ridge portion 3g, and is not disposed on the principal surface 3a. The first electrode layer E1 included in the electrode portion 5a is in contact with the entire ridge portion 3g. The ridge portion 3g is entirely covered with the first electrode layer E1. The principal surface 3a is not covered with the first electrode layer E1, and is exposed from the first electrode layer E1. The first electrode layer E1 included in the electrode portion 5a is entirely covered with the second electrode layer E2. The second electrode layer E2 included in the electrode portion 5a is in contact with one part of the principal surface 3a and the entire first electrode layer E1.

As described above, in a case in which an element is described as covering another element, the element may directly cover the other element or indirectly cover the other element. In a case in which an element is described as indirectly covering another element, an intervening element is present between the element and the other element. In a case in which an element is described as directly covering another element, no intervening element is present between the element and the other element.

The second electrode layer E2 included in the electrode portion 5a is disposed on the first electrode layer E1 and the principal surface 3a. The second electrode layer E2 included in the electrode portion 5a is formed to cover the entire ridge portion 3g and the one part of the principal surface 3a. The one part of the principal surface 3a is, for example, the partial region near the end surface 3e, in the principal surface 3a. That is, the one part of the principal surface 3a is close to the end surface 3e. The second electrode layer E2 included in the electrode portion 5a indirectly covers the entire ridge portion 3g in such a manner that the first electrode layer E1 is located between the second electrode layer E2 and the ridge portion 3g. The second electrode layer E2 included in the electrode portion 5a directly covers the one part of the principal surface 3a. The second electrode layer E2 included in the electrode portion 5a directly covers an entire portion of the first electrode layer E1 formed on the ridge portion 3g.

The electrode portion 5b is three-layered. The first electrode layer E1 included in the electrode portion 5b is disposed on the ridge portion 3h, and is not disposed on the principal surface 3b. The first electrode layer E1 included in the electrode portion 5b is in contact with the entire ridge portion 3h. The ridge portion 3h is entirely covered with the first electrode layer E1. The principal surface 3b is not covered with the first electrode layer E1, and is exposed from the first electrode layer E1. The electrode portion 5b does not include the second electrode layer E2. The principal surface 3b is not covered with the second electrode layer E2, and is exposed from the second electrode layer E2. The second electrode layer E2 is not formed on the principal surface 3b.

The electrode portion 5c includes a plurality of regions $5c_1$ and $5c_2$. The region $5c_2$ is located closer to the principal surface 3a than the region $5c_1$. In the present embodiment, the electrode portion 5c includes only two regions $5c_1$ and $5c_2$. The region $5c_1$ includes the first electrode layer E1, the third electrode layer E3, and the fourth electrode layer E4. The region $5c_1$ does not include the second electrode layer E2. The region $5c_1$ is three-layered. The region $5c_2$ includes the first electrode layer E1, the second electrode layer E2, the third electrode layer E3, and the fourth electrode layer E4. The regions $5c_2$ is four-layered on the ridge portion 3i, and is three-layered on the side surface 3c. The region $5c_1$ is the region where the first electrode layer E1 is exposed from the second electrode layer E2. The region $5c_2$ is the region where the first electrode layer E1 is covered with the second electrode layer E2.

The first electrode layer E1 included in the electrode portion 5c is disposed on the ridge portion 3i, and is not disposed on the side surface 3c. The first electrode layer E1 included in the electrode portion 5c is in contact with the entire ridge portion 3i. The ridge portion 3i is entirely covered with the first electrode layer E1. The side surface 3c is not covered with the first electrode layer E1, and is exposed from the first electrode layer E1.

The second electrode layer E2 included in the electrode portion 5c is disposed on the first electrode layer E1 and the side surface 3c. The second electrode layer E2 included in the electrode portion 5c is formed to cover one part of the ridge portion 3i and one part of the side surface 3c. The one part of the ridge portion 3i is, for example, a partial region near the principal surface 3a, in the ridge portion 3i. That is, the one part of the ridge portion 3i is close to the principal surface 3a. The one part of the side surface 3c is, for example, a corner region near the principal surface 3a and end surface 3e, in the side surface 3c. That is, the one part of the side surface 3c is close to the principal surface 3a and end surface 3e. The second electrode layer E2 included in the electrode portion 5c indirectly covers the one part of the ridge portion 3i in such a manner that the first electrode layer E1 is located between the second electrode layer E2 and the ridge portion 3i. The second electrode layer E2 included in the electrode portion 5c directly covers the one part of the side surface 3c. The second electrode layer E2 included in the electrode portion 5c directly covers one part of the portion of the first electrode layer E1 formed on the ridge portion 3i. One part of the first electrode layer E1 included in the electrode portion 5c is covered with the second electrode layer E2. The second electrode layer E2 included in the electrode portion 5c is in contact with the one part of the side surface 3c and the one part of the first electrode layer E1.

The electrode portion 5e includes a plurality of regions $5e_1$ and $5e_2$. The region $5e_2$ is located closer to the principal surface 3a than the region $5e_1$. In the present embodiment, the electrode portion 5e includes only two regions $5e_1$ and $5e_2$. The region $5e_1$ includes the first electrode layer E1, the third electrode layer E3, and the fourth electrode layer E4. The region $5e_1$ does not include the second electrode layer E2. The region $5e_1$ is three-layered. The region $5e_2$ includes the first electrode layer E1, the second electrode layer $E2_1$, the third electrode layer E3, and the fourth electrode layer E4. The regions $5e_2$ is four-layered. The region $5e_1$ is the region where the first electrode layer E1 is exposed from the second electrode layer E2. The region $5e_2$ is the region where the first electrode layer E1 is covered with the second electrode layer E2.

The first electrode layer E1 included in the electrode portion 5e is disposed on the end surface 3e. The end surface 3e is entirely covered with the first electrode layer E1. The first electrode layer E1 included in the electrode portion 5e is in contact with the entire end surface 3e. The first electrode layer E1 included in the electrode portion 5e is formed on the end surface 3e to be coupled to the one ends of the corresponding internal electrodes 7 or 9.

The second electrode layer E2 included in the electrode portion 5e is disposed on the first electrode layer E1. The second electrode layer E2 included in the electrode portion 5e is formed to cover one part of the end surface 3e. The one part of the end surface 3e is, for example, a partial region near the principal surface 3a, in the end surface 3e. That is, the one part of the end surface 3e is close to the principal surface 3a. The second electrode layer E2 included in the electrode portion 5e indirectly covers the one part of the end surface 3e in such a manner that the first electrode layer E1 is located between the second electrode layer E2 and the end surface 3e. The second electrode layer E2 included in the electrode portion 5e directly covers one part of the portion of the first electrode layer E1 formed on the end surface 3e. The first electrode layer E1 is partially covered with the second electrode layer E2. The second electrode layer E2 included in the electrode portion 5e is in contact with one part of the first electrode layer E1.

The first electrode layer E1 is formed by sintering conductive paste applied onto the surface of the element body 3. The first electrode layer E1 is formed to cover the end surface 3e and the ridge portions 3g, 3h, and 3i. The first electrode layer E1 is formed by sintering a metal component (metal powder) contained in the conductive paste. The first electrode layer E1 includes a sintered metal layer. The first electrode layer E1 includes a sintered metal layer formed on the element body 3. The first electrode layer E1 is not intentionally formed on the pair of principal surfaces 3a and 3b and the pair of side surfaces 3c. The first electrode layer E1 may be unintentionally formed on the principal surfaces 3a and 3b and the side surfaces 3c due to a production error, for example.

In the present embodiment, the first electrode layer E1 is a sintered metal layer made of Cu. The first electrode layer E1 may be a sintered metal layer made of Ni. The first electrode layer E1 contains a base metal. The conductive paste contains, for example, powder made of Cu or Ni, a glass component, an organic binder, and an organic solvent.

The second electrode layer E2 is formed by curing conductive resin applied onto the first electrode layer E1, the principal surface 3a, and the pair of side surfaces 3c. The second electrode layer E2 is formed over the first electrode layer E1 and the element body 3. In the present embodiment, the second electrode layer E2 covers one part of the first electrode layer E1. The second electrode layer E2 covers the regions corresponding to the electrode portion 5a, the region $5c_2$ of the electrode portion 5c, and the region $5e_2$ of the electrode portion 5e, in the first electrode layer E1. The second electrode layer E2 directly covers one part of the ridge portion 3j. The second electrode layer E2 is in contact with the one part of the ridge portion 3j. The first electrode layer E1 serves as an underlying metal layer for forming the second electrode layer E2. The second electrode layer E2 is a conductive resin layers formed on the first electrode layer E1.

The conductive resin contains, for example, a resin, a conductive material, and an organic solvent. The resin is, for example, a thermosetting resin. The conductive material is, for example, metal powder. The metal powder is, for example, Ag powder or Cu powder. The thermosetting resin is, for example, a phenolic resin, an acrylic resin, a silicone resin, an epoxy resin, or a polyimide resin.

The third electrode layer E3 is formed on the second electrode layer E2 and the first electrode layer E1 by plating method. The third electrode layer E3 is formed on a portion of the first electrode layer E1 exposed from the second electrode layer E2. The third electrode layer E3 directly covers the second electrode layer E2 and the portion of the first electrode layer E1 exposed from the second electrode layer E2. In the present embodiment, the third electrode layer E3 is formed on the first electrode layer E1 and the second electrode layer E2 by Ni plating. The third electrode layer E3 is a Ni plating layer. The third electrode layer E3 may be an Sn plating layer, a Cu plating layer, or an Au plating layer. The third electrode layer E3 contains Ni, Sn, Cu, or Au.

The fourth electrode layer E4 is formed on the third electrode layer E3 by plating method. The fourth electrode layer E4 is indirectly covers the second electrode layer E2 and the portion of the first electrode layer E1 exposed from the second electrode layer E2 in such a manner that the third electrode layer E3 is located between the fourth electrode layer E4 and the second electrode layer E2 and portion of the first electrode layer E1 exposed from the second electrode layer E2. In the present embodiment, the fourth electrode layer E4 is formed on the third electrode layer E3 by Sn plating. The fourth electrode layer E4 is an Sn plating layer. The fourth electrode layer E4 may be a Cu plating layer or an Au plating layer. The fourth electrode layer E4 contains Sn, Cu, or Au. The third electrode layer E3 and the fourth electrode layer E4 constitute a plating layer formed on the second electrode layer E2. In the present embodiment, the plating layer formed on the second electrode layer E2 is two-layered.

The first electrode layer E1 included in the electrode portion 5a, the first electrode layer E1 included in the electrode portion 5b, the first electrode layer E1 included in the electrode portion 5c, and the first electrode layer E1 included in the electrode portion 5e are integrally formed. The second electrode layer E2 included in the electrode portion 5a, the second electrode layer E2 included in the electrode portion 5c, and the second electrode layer E2 included in the electrode portion 5e are integrally formed. The third electrode layer E3 included in the electrode portion 5a, the third electrode layer E3 included in the electrode portion 5b, the third electrode layer E3 included in the electrode portion 5c, and the third electrode layer E3 included in the electrode portion 5e are integrally formed. The fourth electrode layer E4 included in the electrode portion 5a, the fourth electrode layer E4 included in the electrode portion 5b, the fourth electrode layer E4 included in the electrode portion 5c, and the fourth electrode layer E4 included in the electrode portion 5e are integrally formed.

Each of the first electrode layers E1 (first electrode layers E1 included in the electrode portions 5e) is formed on the end surface 3e to be connected to the respective internal electrodes 7 and 9. The first electrode layer E1 covers the entire end surface 3e, the entire ridge portion 3g, the entire ridge portion 3h, and the entire ridge portion 3i. The second electrode layer E2 (second electrode layer E2 included in the electrode portions 5a, 5c, and 5e) continuously covers one part of the principal surface 3a, one part of the end surface 3e, and one part of each of the pair of side surfaces 3c. The second electrode layer E2 integrally covers a region near the end surface 3e of the principal surface 3a, a region near the principal surface 3a of the end surface 3e, and a region near the principal surface 3a of the side surface 3c. The second electrode layer E2 is formed on the principal surface 3a, and not formed on the principal surface 3b. The second electrode layer E2 does not cover the principal surface 3b.

The second electrode layer E2 (second electrode layer E2 included in the electrode portions 5a, 5c, and 5e) covers the entire ridge portion 3g, one part of the ridge portion 3i, and one part of the ridge portion 3j. The second electrode layer E2 covers the entire ridge portion 3g, the one part of the ridge portion 3i, and the one part of the ridge portion 3j in such a manner that the first electrode layer E1 is located between the second electrode layer E2 and the ridge portions 3g, 3i, and 3j. The second electrode layer E2 directly covers the entire portion of the first electrode layer E1 formed on the ridge portion 3g, one part of the portion of the first electrode layer E1 formed on the ridge portion 3i, and one part of the portion of the first electrode layer E1 formed on the ridge portion 3j. The second electrode layer E2 includes a plurality of portions each corresponding to the one part of the principal surface 3a, the one part of the end surface 3e, the one part of each of the pair of side surfaces 3c, the entire ridge portion 3g, the one part of the ridge portion 3i, and the one part of the ridge portion 3j.

The first electrode layer E1 (first electrode layer E1 included in the electrode portions 5a, 5b, 5c, and 5e) includes a region covered with the second electrode layer E2 (second electrode layer E2 included in the electrode portions 5a, 5c, and 5e), and a region not covered with the second electrode layer E2 (second electrode layer E2 included in the electrode portions 5a, 5c, and 5e). The region not covered with the second electrode layer E2 is a region exposed from the second electrode layers layer E2. The third electrode layer E3 and the fourth electrode layer E4 cover the region on the first electrode layer E1 not covered with the second electrode layer E2 and the second electrode layer E2. The first electrode layer E1 (first electrode layer E1 included in the electrode portion 5e) is directly connected to the respective internal electrodes 7 and 9.

As illustrated in FIG. 6, when viewed from the first direction D1, the first electrode layer E1 (first electrode layer E1 included in the electrode portion 5a) is entirely covered with the second electrode layer E2. When viewed from the first direction D1, the first electrode layer E1 (first electrode layer E1 included in the electrode portion 5a) is not exposed from the second electrode layer E2.

As illustrated in FIG. 7, when viewed in the second direction D2, the end region near the principal surface 3a of the first electrode layer E1 is covered with the second electrode layer E2. The end region near the principal surface 3a of the first electrode layer E1 includes the first electrode layer E1 included in the region $5c_2$. When viewed from the second direction D2, an end edge E2e of the second electrode layer E2 crosses an end edge E1e of the first electrode layer E1. When viewed from the second direction D2, the end region near the principal surface 3b of the first electrode layer E1 is exposed from the second electrode layer E2. The end region near the principal surface 3b of the first electrode layer E1 includes the first electrode layer E1 included in the region $5c_1$. An area of the second electrode layer E2 located on the side surface 3c and the ridge portion 3i is larger than an area of the first electrode layer E1 located on the ridge portion 3i.

As illustrated in FIG. 8, when viewed from the third direction D3, the end region near the principal surface 3a of the first electrode layer E1 is covered with the second electrode layer E2. The end region near the principal surface 3a of the first electrode layer E1 includes the first electrode layer E1 included in the region $5e_2$. When viewed from the third direction D3, the end edge E2e of the second electrode layer E2 is located on the first electrode layer E1. When viewed from the third direction D3, the end region near the principal surface 3b of the first electrode layer E1 is exposed from the second electrode layer E2. The end region near the principal surface 3b of the first electrode layer E1 includes the first electrode layer E1 included in the region $5e_1$. An area of the second electrode layer E2 located on the end surface 3e and the ridge portion 3g is smaller than an area of the first electrode layer E1 located on the end surface 3e and the ridge portion 3g.

In the present embodiment, the second electrode layer E2 continuously covers only the one part of the principal surface 3a, only the one part of the end surface 3e, and only the one part of each of the pair of side surfaces 3c. The second electrode layer E2 covers the entire ridge portion 3g, only the one part of the ridge portion 3i, and only the one part of the ridge portion 3j. The one part of the portion, of the first electrode layer E1, covering the ridge portion 3i is exposed from the second electrode layer E2. For example, the first electrode layer E1 included in the region $5c_1$ is exposed from the second electrode layer E2.

As illustrated in FIG. 2, a width of the region $5c_2$ in the third direction D3 decreases with an increase in distance from the principal surface 3a. The width of the region $5c_2$ in a third direction D3 decreases with an increase in distance from the electrode portion 5a. A width of the region $5c_2$ in the first direction D1 decreases with an increase in distance from the end surface 3e. The width of the region $5c_2$ in the first direction D1 decreases with an increase in distance from the electrode portion 5e. In the present embodiment, an end edge of the region $5c_2$ has an approximately arc shape when viewed from the second direction D2. The region $5c_2$ has an approximately fan shape when viewed from the second direction D2. In the present embodiment, as illustrated in FIG. 7, a width of the second electrode layer E2 viewed from the second direction D2 decreases with an increase in distance from the principal surface 3a. The end edge E2e of the second electrode layer E2 has an approximately arc shape.

Figure 9:
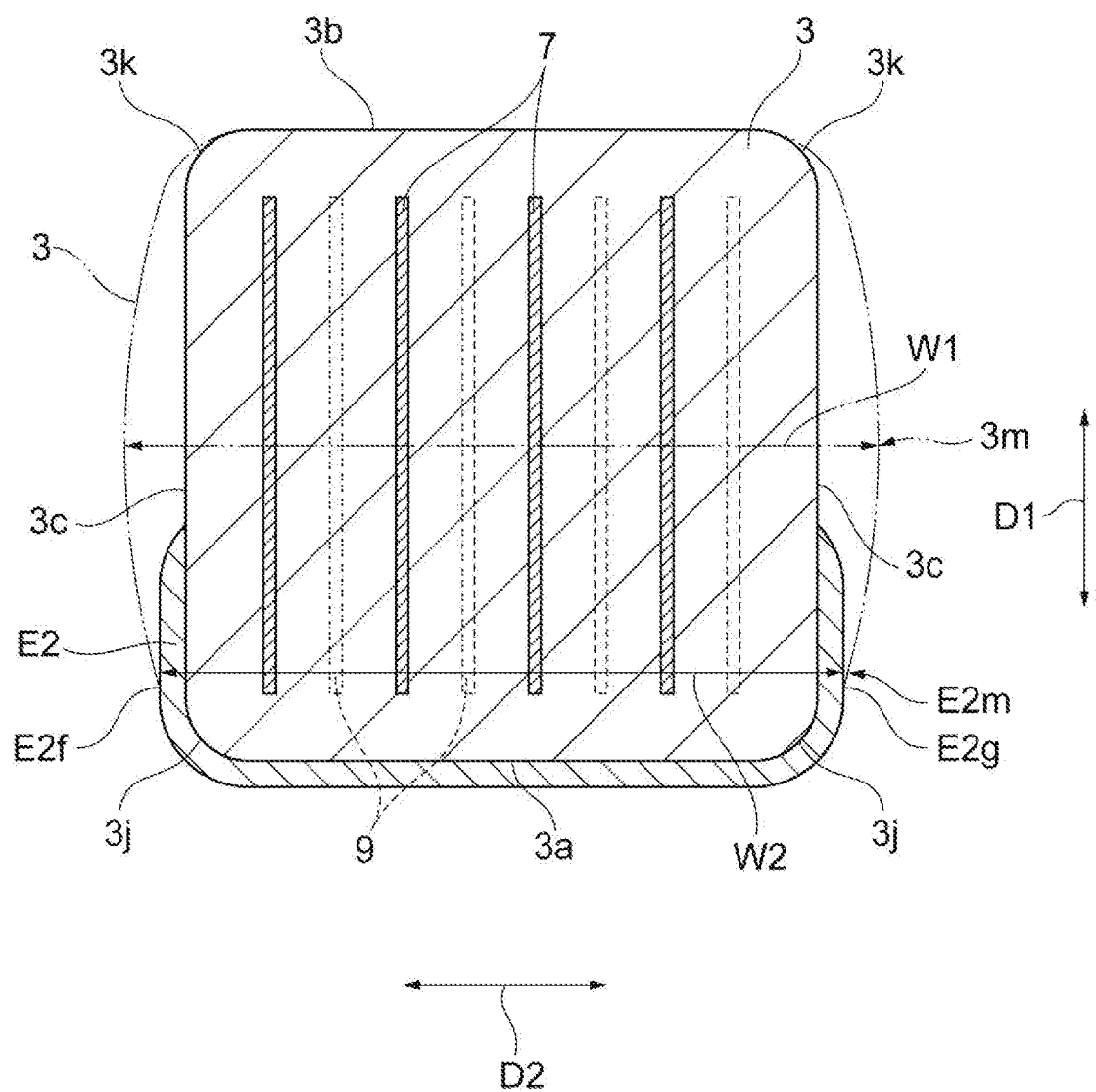
FIG. 9 is a view illustrating a cross-sectional configuration of the multilayer capacitor taken along line IX-IX in FIG. 2.
Figure 10:
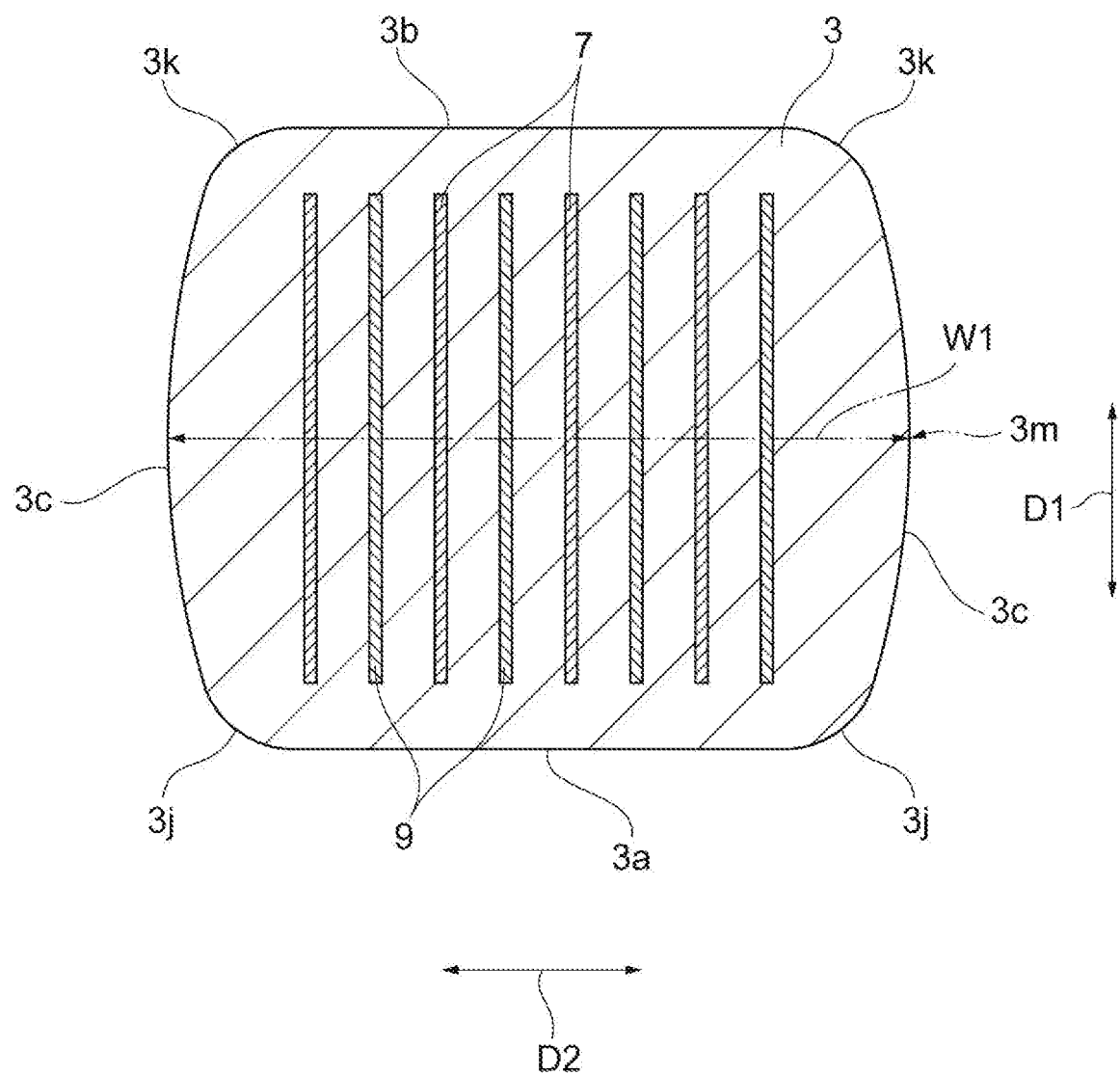
FIG. 10 is a view illustrating a cross-sectional configuration of the element body taken along line X-X in FIG. 2.

Next, with reference to FIGS. 9 and 10, a relationship between sizes of the element body 3 and second electrode layer E2 when viewed from the third direction D3 will be described. FIG. 9 is a view illustrating a cross-sectional configuration of the multilayer capacitor taken along line IX-IX in FIG. 2. FIG. 10 is a view illustrating a cross-sectional configuration of the element body taken along line X-X in FIG. 2. The line IX-IX is located close to the end surface 3e in the third direction D3. The line IX-IX does not pass through the region $5c_1$, and passes through the region $5c_2$. In FIG. 9, an outline of the element body 3 in the cross section taken along the line X-X is illustrated by overlapping the multilayer capacitor C1 in the cross section taken along the line IX-IX. The outline of the element body 3 is indicated by a chain double-dashed line. The line X-X is located at an approximately equal distance from the pair of end surfaces 3e in the third direction D3. The line X-X is located at an approximate center of the element body 3 in the third direction D3.

As illustrated in FIG. 9, the width of the element body 3 in the cross section taken along line IX-IX is approximately constant at any position in the first direction D1. The width of the element body 3 is the width (length) of the element body 3 in the second direction D2. The side surface 3c does not bulge outward and is approximately flat in the cross section taken along the line IX-IX, that is, at a position close to the end surface 3e in the third direction D3. As illustrated by the chain double-dashed line in FIG. 9 and in FIG. 10, in the cross section taken along the line X-X, the width of the element body 3 is the largest at a central position in the first direction D1. The width of the element body 3 gradually decreases with an increase in distance in the first direction D1 from the central position. The side surface 3c bulges outward in the cross section taken along the line X-X, that is, at a central position in the third direction D3. The central position of the element body 3 in the first direction D1 is a position at which the distances from the respective principal surfaces 3a and 3b in the first direction are equivalent. The central position of the element body 3 in the third direction D3 is a position at which the distances from the respective end surfaces 3e in the third direction D3 are equivalent. "Equivalent" does not necessarily only mean that values are consistent. Even if values include a slight difference in a predetermined range, measurement error, or the like, the values may be defined to be equal.

The side surface 3c gradually bulges with a decrease in distance to the central position in the third direction D3 from a position close to each end surface 3e in the side surface 3c serving as a starting point. The position close to each end surface 3e in the side surface 3c is, for example, a boundary position between the side surface 3c and the ridge portion 3i. The side surface 3c gradually bulges with a decrease in distance to the central position in the first direction D1 from a position close to each of the principal surfaces 3a and 3b in the side surface 3c serving as a starting point. The position close to each of the principal surface 3a in the side surface 3c is, for example, a boundary position between the side surface 3c and the ridge portion 3j. The position close to each of the principal surface 3b in the side surface 3c is a boundary position between the side surface 3c and the ridge portion 3k. The bulge of the side surface 3c is the largest at the central position in the third direction D3 and also at the central position in the first direction D1. The side surface 3c protrudes the most at a central position of the side surface 3c. The central position of the side surface 3c is a position at which the distance from a short side close to each end surface 3e in the third direction D3 is equivalent on the side surface 3c and also the distance from a long side close to each of the principal surfaces 3a and 3b in the first direction D1 is equivalent on the side surface 3c.

The width of the element body 3 is the largest at the central position in the third direction D3 and also at the central position in the first direction D1. The element body 3 protrudes outward in the second direction D2 the most at the central position in the third direction D3 and also at the central position in the first direction D1. The side surface 3c has a convex surface bulging outward. When viewed from the third direction D3, the side surface 3c has an approximately circular outline having the most protruding portion outward in the second direction D2 at the central position in the first direction D1. When viewed from the third direction D3, the outline of the side surface 3c bulges the most at the central position in the first direction D1. When viewed from the third direction D3, the element body 3 includes a maximum width portion 3m in which the width in the second direction D2 is the largest at the central position in the first direction D1. When viewed from the third direction D3, the width of the element body 3 gradually decreases with an increase in distance in the first direction D1 from the maximum width portion 3m.

When viewed from the third direction D3, an entire length of the second electrode layer E2 in the second direction D2 is the largest at a position close to the principal surface 3a in the first direction D1. The entire length of the second electrode layer E2 in the second direction D2 is a length of the second electrode layer E2 from one end E2g to another end E2f in the second direction D2. A maximum position E2m of the second electrode layer E2 is located close to the principal surface 3a in the first direction D1. The maximum position E2m is a position at which the entire length of the second electrode layer E2 in the second direction D2 is the largest. The maximum position E2m is located closer to the principal surface 3a than to the principal surface 3b in the first direction D1. The distance in the first direction D1 from the principal surface 3a to the maximum position E2m is smaller than the distance in the first direction D1 from the principal surface 3b to the maximum position E2m. When viewed from the third direction D3, the distance in the first direction D1 from the principal surface 3a to the maximum position E2m is smaller than the distance in the first direction D1 from the end edge E2e of the second electrode layer E2 to the maximum position E2m. In the present embodiment, when viewed from the third direction D3, the end edge E2e of the second electrode layer E2 is located closer to the principal surface 3a than the maximum width portion 3m.

When viewed from the third direction D3, the maximum position E2m of the second electrode layer E2 is located closer to the principal surface 3a than the maximum width portion 3m of the element body 3 in the first direction D1. The maximum position E2m of the second electrode layer E2 is located closer to the principal surface 3a than the maximum width portion 3m in the first direction D1. The distance in the first direction D1 from the principal surface 3a to the maximum position E2m is smaller than the distance in the first direction D1 from the principal surface 3a to the maximum width portion 3m. When viewed from the third direction D3, the second electrode layer E2 is provided in such a manner that the maximum position E2m is located in a region of the element body 3 in which the width in the second direction D2 is smaller than the maximum width. When viewed from the third direction D3, the second electrode layer E2 is provided in such a manner that the maximum position E2m is located in a region in which the bulge of the side surface 3c is smaller than the bulge in the maximum width portion 3m.

In the present embodiment, when viewed from the third direction D3, the entire second electrode layer E2 is located closer to the principal surface 3a than the maximum width portion 3m in the first direction D1. When viewed from the third direction D3, the second electrode layer E2 continuously extends from a partial region near the side surface 3c in the principal surface 3a to a partial region near the principal surface 3a in the side surface 3c beyond the ridge portion 3j. In other words, when viewed from the third direction D3, the second electrode layer E2 continuously extends from the partial region near the principal surface 3a in the side surface 3c to the partial region near the side surface 3c in the principal surface 3a beyond the ridge portion 3j. The second electrode layer E2 extends between the boundary position with the ridge portion 3j and the position closer to the principal surface 3a than the maximum width portion 3m on the side surface 3c.

When viewed from the third direction D3, a width W1 of the maximum width portion 3m is larger than a length W2 of the second electrode layer E2 at the maximum position E2m. When viewed from the third direction D3, the element body 3 protrudes outward from the second electrode layer E2 in the second direction D2. The entire second electrode layer E2 is located inside the maximum width portion 3m of the element body 3 in the second direction D2.

Next, a mounted structure of the multilayer capacitor C1 will be described with reference to FIG. 11. FIG. 11 is a view illustrating a mounted structure of a multilayer capacitor according to the embodiment.

As illustrated in FIG. 11, an electronic component device ECD1 includes the multilayer capacitor C1 and an electronic device ED. The electronic device ED includes, for example, a circuit board or an electronic component.

The multilayer capacitor C1 is solder-mounted on the electronic device ED. The electronic device ED includes a principal surface EDa and a plurality of pad electrodes PE1 and PE2. In the present embodiment, the electronic device ED includes two pad electrodes PE1 and PE2. Each of the pad electrodes PE1 and PE2 is disposed on the principal surface EDa. The two pad electrodes PE1 and PE2 are separated from each other. The multilayer capacitor C1 is disposed on the electronic device ED in such a manner that the principal surface 3a and the principal surface EDa oppose each other. As described above, the principal surface 3a is arranged to constitute the mounting surface.

When the multilayer capacitor C1 is solder-mounted, molten solder wets to the external electrodes 5 (fourth electrode layer E4). Solder fillets SF are formed on the external electrodes 5 by solidification of the wet solder. The external electrodes 5 and the pad electrodes PE1 and PE2 corresponding to each other are coupled via the solder fillets SF.

The solder fillet SF is formed on the regions $5e_1$ and $5e_2$ of the electrode portion 5e. In addition to the region $5e_2$, the region $5e_1$ that does not include the second electrode layer E2 is also coupled to the corresponding pad electrode PE1 or PE2 via the solder fillet SF. Although illustration is omitted, the solder fillet SF is also formed on the regions $5c_1$ and $5c_2$ of the electrode portion 5c. The solder fillet SF overlaps the region of the first electrode layer E1 exposed from the second electrode layer E2. A height of the solder fillet SF in the first direction D1 is larger than a height of the second electrode layer E2 in the first direction D1. The solder fillet SF extends closer to the principal surface 3b beyond the end edge E2e of the second electrode layer E2 in the first direction D1.

As described above, in the present embodiment, the external electrode 5 includes the second electrode layer E2. Even in a case in which external force is applied onto the multilayer capacitor C1 from the electronic device ED, the second electrode layer E2 absorbs stress acting on the element body 3. Therefore, the multilayer capacitor C1 suppresses occurrence of a crack in the element body 3 due to the external force.

When viewed from the third direction D3, the maximum position E2m of the second electrode layer E2 is located closer to the principal surface 3a than the maximum width portion 3m of the element body 3 in the first direction D1. When viewed from the third direction D3, the second electrode layer E2 is provided in such a manner that the maximum position E2m is located in a region of the element body 3 in which the width in the second direction D2 is smaller than the maximum width. Therefore, even in a case in which the thickness of the second electrode layer E2 is made large to sufficiently suppress the occurrence of a crack in the element body 3, the second electrode layer E2 tends not to protrude outward from the element body 3 in the second direction D2 when viewed from the third direction D3.

Consequently, in the multilayer capacitor C1, an increase in size is suppressed and the occurrence of a crack in the element body 3 is sufficiently suppressed.

In the multilayer capacitor C1, when viewed from the third direction D3, the width of the maximum width portion 3m in the second direction D2 is larger than the length of the second electrode layer E2 at the maximum position E2m. In the multilayer capacitor C1, when viewed from the third direction D3, the element body 3 protrudes outward from the second electrode layer E2 in the second direction D2. Even in a case in which a plurality of multilayer capacitors C1 is mounted narrowly adjacent to each other, a distance between the external electrodes 5 is larger than a distance between the element bodies 3 between the adjacent multilayer capacitors C1. Therefore, a short circuit due to a solder bridge tends not to occur between the adjacent multilayer capacitors C1. The second electrode layer E2 does not protrude outward from the element body 3 in the second direction D2 when viewed from the third direction D3, and thus the second electrode layer E2 tends not to receive impact from the outside and tends not to be peeled off.

In the multilayer capacitor C1, the principal surface 3a is arranged to constitute the mounting surface, and the internal electrodes 7 and 9 oppose each other in the second direction D2. A current path formed for each of the internal electrodes 7 and 9 is short in the multilayer capacitor C1. Therefore, the multilayer capacitor C1 has low ESL.

In the multilayer capacitor C1, the second electrode layer E2 does not cover the principal surface 3b. In the multilayer capacitor C1, the principal surface 3a covered with the second electrode layer E2 and the principal surface 3b not covered with the second electrode layer E2 are easily distinguished. Therefore, when the multilayer capacitor C1 is mounted, the principal surface 3a (mounting surface) is reliably identified, and the multilayer capacitor C1 is appropriately picked up.

Although the embodiments and modifications of the present invention have been described above, the present invention is not necessarily limited to the embodiments and modifications, and the embodiment can be variously changed without departing from the scope of the invention.

The first electrode layer E1 may be formed on the principal surface 3a to extend over the ridge portion 3g entirely or partially from the end surface 3e. The first electrode layer E1 may be formed on the principal surface 3b to extend beyond the ridge portion 3h entirely or partially from the end surface 3e. The first electrode layer E1 may be formed on the side surface 3c to extend beyond the ridge portion 3i entirely or partially from the end surface 3e.

The second electrode layer E2 may cover not only the one part of the end surface 3e, that is, the partial region near the principal surface 3a of the end surface 3e but also the entire end surface 3e. The second electrode layer E2 may cover one part of the principal surface 3b to extend beyond the entire or one part of the ridge portion 3h. The second electrode layer E2 may cover one part of the side surface 3c to extend beyond the entire ridge portion 3i from the end surface 3e.

In the embodiment described above, the second electrode layer E2 covers the principal surface 3a, the end surface 3e, and the pair of side surfaces 3c, and does not cover the principal surface 3b. In a case in which the principal surface 3a is arranged to constitute the mounting surface, the second electrode layer E2 may cover the principal surface 3a and the pair of side surfaces 3c. The configuration of the second electrode layer E2 may include configurations other than those described above.

For example, the second electrode layer E2 may further cover the principal surface 3b. In this case, the second electrode layer E2 may integrally cover a region near the end surface 3e in the principal surface 3b, a region near the principal surface 3b in the end surface 3e, and a region near the principal surface 3b in the side surface 3c. In this modification, when viewed from the third direction D3, the maximum position of the second electrode layer E2 is also located closer to the principal surface 3b than the maximum width portion 3m of the element body 3. The portion of the second electrode layer E2 covering the principal surface 3b is also provided in such a manner that, in a similar manner to the portion covering the principal surface 3a, the maximum position is located in a region of the element body 3 in which the width in the second direction D2 is smaller than the maximum width when viewed from the third direction D3. Therefore, in the modification in which the second electrode layer E2 covers the pair of principal surfaces 3a and 3b, even in a case in which the thickness of the second electrode layer E2 is made large to sufficiently suppress the occurrence of a crack in the element body 3, the second electrode layer E2 tends not to protrude outward from the element body 3 in the second direction D2 when viewed from the third direction D3.

The electronic component of the embodiment is the multilayer capacitor C1. Applicable electronic component is not limited to the multilayer capacitor. Examples of the applicable electronic components include, but not limited to, multilayer electronic components such as a multilayer feedthrough capacitor, a multilayer inductor, a multilayer varistor, a multilayer piezoelectric actuator, a multilayer thermistor, or a multilayer composite component, and electronic components other than the multilayer electronic components.

What is claimed is:
1. An electronic component, comprising:
an element body of a rectangular parallelepiped shape including a pair of principal surfaces opposing each other in a first direction, a pair of side surfaces oppos- ing each other in a second direction, and a pair of end surfaces opposing each other in a third direction;
a plurality of spaced internal electrodes that oppose each other in the second direction; and
a plurality of external electrodes disposed at both end portions of the element body in the third direction, wherein
the plurality of external electrodes includes a conductive resin layer covering one principal surface of the pair of principal surfaces and the pair of side surfaces,
when viewed from the third direction, the element body includes a maximum width portion in which a width in the second direction is the largest at a central position in the first direction, and the width of the element body gradually decreases from the maximum width portion in the first direction, and
when viewed from the third direction, a maximum position in which a length from one end to another end of the conductive resin layer in the second direction is the largest is located closer to the one principal surface than the maximum width portion in the first direction.

2. The electronic component according to claim 1, wherein
when viewed from the third direction, the width of the maximum width portion in the second direction is larger than the length at the maximum position of the conductive resin layer.

3. The electronic component according to claim 1, wherein:
the plurality of spaced internal conductors are connected to the external electrodes, and
the one principal surface is arranged to constitute a mounting surface.

4. The electronic component according to claim 1, wherein
the conductive resin layer does not cover another principal surface of the pair of principal surfaces.

5. The electronic component according to claim 1, wherein
the conductive resin layer further covers one end surface of the pair of end surfaces, and
when viewed from the third direction, an end edge of the conductive resin layer is located closer to the one principal surface than the maximum width portion.

6. An electronic component, comprising:
an element body of a rectangular parallelepiped shape including a pair of principal surfaces opposing each other in a first direction, a pair of side surfaces opposing each other in a second direction, and a pair of end surfaces opposing each other in a third direction;
an internal electrode that extends in the first direction and the third direction and is perpendicular to the second direction; and
an external electrode disposed on an end portion of the element body in the third direction, wherein
the external electrode includes a conductive resin layer covering one principal surface of the pair of principal surfaces and the pair of side surfaces,
when viewed from the third direction, a width of the element body in the second direction is the largest at a central position in the first direction, and gradually decreases from the central portion in the first direction, and
when viewed from the third direction, a position in which a length from one end to another end of the conductive resin layer in the second direction is the largest is located closer to the one principal surface than the central position.

7. The electric component according to claim 1, wherein the maximum position is located between the one principal surface and the maximum width portion.

* * * * *